Patented Feb. 12, 1924.

1,483,160

UNITED STATES PATENT OFFICE.

MAYNARD J. CREIGHTON, OF WILMINGTON, DELAWARE, ASSIGNOR TO DARCO CORPORATION, OF WILMINGTON, DELAWARE, A CORPORATION OF DELAWARE.

RECOVERING SODA AND ACTIVE CARBON.

No Drawing.   Application filed March 28, 1922. Serial No. 547,540.

*To all whom it may concern:*

Be it known that I, MAYNARD J. CREIGHTON, a citizen of the United States, residing at Wilmington, in the county of New Castle and State of Delaware, have invented certain new and useful Improvements in Recovering Soda and Active Carbons, of which the following is a specification.

This invention relates to recovering soda and active carbon; and it comprises a method of recovering soda in pure and useful form and of producing activated carbon wherein black liquors from soda pulp manufacture are concentrated, carbonized and incinerated, the residues after incineration being subjected to a further heating at a high temperature in the presence of streaming steam or the like to complete the carbonization; soda being thereafter separated by leaching from the activated carbon produced; all as more fully hereinafter set forth and as claimed.

In the manufacture of paper pulp by the various alkaline processes, it is customary to digest wood under pressure with a solution containing caustic soda. About half the wood goes into solution and about half remains undissolved as paper pulp or cellulose. The pulp is separated from this solution, which is ordinarily called black liquor. It contains, in addition to soda, a large amount of organic material which must be disposed of in order to regain the soda in condition for re-use. This is usually done by evaporating the liquor to a thick or sirupy condition, drying, incinerating or burning, leaching and causticizing the leachings.

The black liquor is usually evaporated in multiple effects to a sirupy condition and this sirup, which still contains some water, is dried down, carbonized and burnt in an incinerating or burning device; this being a sort of reverberatory hearth or a rotary cylindrical kiln provided with firing means. Incineration is under oxidizing conditions with free access of air to take as much advantage as possible of the fuel value of the organic matters. This combustion, however, because of the presence of fusible sodium salts and soda is never complete, the final product being in the nature of a char. It is desirable that the carbon in this be present as such, i. e., not in the form of organic compounds which would contaminate and color the leachings in recovering soda. This result, however, is difficult to accomplish in a practical way. If the temperature be carried too high in the effort to free the carbon of volatiles, there is apt to be a loss of soda by volatilization, formation of silicates, etc., while, on the other hand, low temperature incineration gives impure soda on leaching. Much skill is required in the operation. The incinerated material is leached with water to give a solution of carbonate of soda which is causticized with lime and is then ready for re-use.

The carbon left in leaching the incinerated residues is of an active type and is useful for decolorizing purposes, as an adsorbent in gas masks, etc. It is, however, not so active for these purposes as some of the commercial grades of activated carbon and is therefore discarded, no use being made of it. It can be activated by a further heating but the results leave something to be desired.

It is the object of the present invention to produce a carbon of unusually high activity and at the same time obtain a better quality of recovered soda; producing a material from which a white liquor can be extracted by leaching without the loss of soda by volatilization, corrosion of brickwork, etc., incident to the use of high temperatures in incineration. To this end I evaporate down the black liquor and then incinerate as usual. After the incineration, I give the residues a further heating treatment in the presence of streaming steam or other carbon-oxidizing gas or vapor at a high temperature; a temperature usually ranging around 600° C. or above. In so doing, the contained carbon is further activated, being rendered much more adsorbent and better adapted for use in decolorizing liquids, and simultaneously hydrocarbons and volatile carbon compounds are effectually removed without loss of soda. At the temperatures and under the conditions stated, the soda does not tend to melt down and if the material produced in incineration is open textured, it remains pervious and open in the described operation. It is effectually freed of volatiles.

Inasmuch as a second heating is to be given the black liquor residues, there is no necessity for pushing the firing and the temperatures during the incineration stage beyond the economic point; the point where a good fuel value is secured. It is not here necessary to remove all the carbon compounds and volatiles and the operator is free to adjust conditions irrespective of this consideration. It is usually better to incinerate at rather low temperatures, thereby securing a better ombustion and an open textured char well adapted for the next step. Firing should be so as to burn as much as may be of the contained organic matter and carbon without production of undue temperatures which would lead to slagging, clinkering or sintering of the material. After incineration the material may be taken while still hot and sent through an externally heated tube of nichrome or other resistant and refractory metal wherein it is heated, as stated, to a temperature around 600° C. or above. During the heating it is desirable to introduce steam in rather an abundant flow; enough to carry away volatilized products as fast as formed. Products of combustion may be employed in lieu of steam. Ordinarily, I pass the material through such a tube as a traveling layer or body; usually so adjusting the speed of travel that the material is exposed to the high temperature and the streaming steam for about 20-60 minutes. The material emerging from the tube may be quenched with water or with steam or otherwise lowered in temperature, and then leached in the ways used in treating black liquor residues. The leachings are a colorless solution of sodium carbonate containing substantially no organic or empyreumatic matter. On causticizing with lime in the usual way, they give a white liquor directly useful in making paper pulp. The percentage recovery of soda is very good, there being little loss in the low temperature incineration or in the reheating.

The carbon may be separated from the liquor in a filter press or in any of the usual ways and washed. Usually I wash to approximate neutrality with water and then with a little acid, using hydrochloric or sulfuric acid. After the acid treatment, the carbon may be again washed and then dried. It seldom needs regrinding to produce a material of extreme fineness. Its decolorizing power is very great.

As will be noted, in the foregoing method I have provided a method whereby an excellent quality of decolorizing carbon may be cheaply obtained from what is practically a waste material; the char of incinerated and leached residues being set to waste, and in connection with this process, I have provided an improved method of recovering good yields of soda of excellent quality.

The carbon recovered in the described manner has an activity of at least 20 times that of boneblack as tested on caramel. Its activity is higher than that of most of the usual decolorizing carbons. As to the reason for this high activity, I express no opinion, contenting myself with noting the fact. I may however, point out in this connection, the fact that the carbon represents not the whole wood, but the portion of it (usually called lignone) which will dissolve in soda. The "lignone" fraction of wood is different in constitution from the cellulose; and it may well be that this difference in constitution of the carbon compounds forming lignone is represented in the carbon formed therefrom by charring. This, however, is merely speculative. The carbon is also unusually voluminous, having a very small apparent specific gravity; usually not to exceed 12 pounds per cubic foot. Its high activity, voluminous character and the fact that it separates well in filter presses, makes the new carbon particularly desirable for decolorizing liquids.

What I claim is:—

1. In the treatment of black liquors for the recovery of soda therefrom and for the production of activated carbon, the process which comprises incinerating evaporated residues of such a liquor, reheating the incinerated material at a temperature around 600° C. or above in the presence of steam and separating soda from carbon by washing.

2. In the treatment of black liquors for the recovery of soda therefrom and for the production of activated carbon, the process which comprises incinerating evaporated residues of such a liquor under conditions giving an open and pervious residue, reheating the incinerated material at a temperature around 600° C. or above in the presence of steam and separating soda from carbon by washing.

3. As a new composition of matter, carbon derived from incinerated black liquor residues; said carbon having an activity of at least 20 times that of boneblack, an apparent density of about 12 pounds per cubic foot and being readily retained by filters.

In testimony whereof, I have hereunto affixed my signature.

MAYNARD J. CREIGHTON.